Dec. 20, 1938.   R. R. MEYER   2,140,964
BEEHIVE FRONTAL ENCLOSURE
Filed June 22, 1937
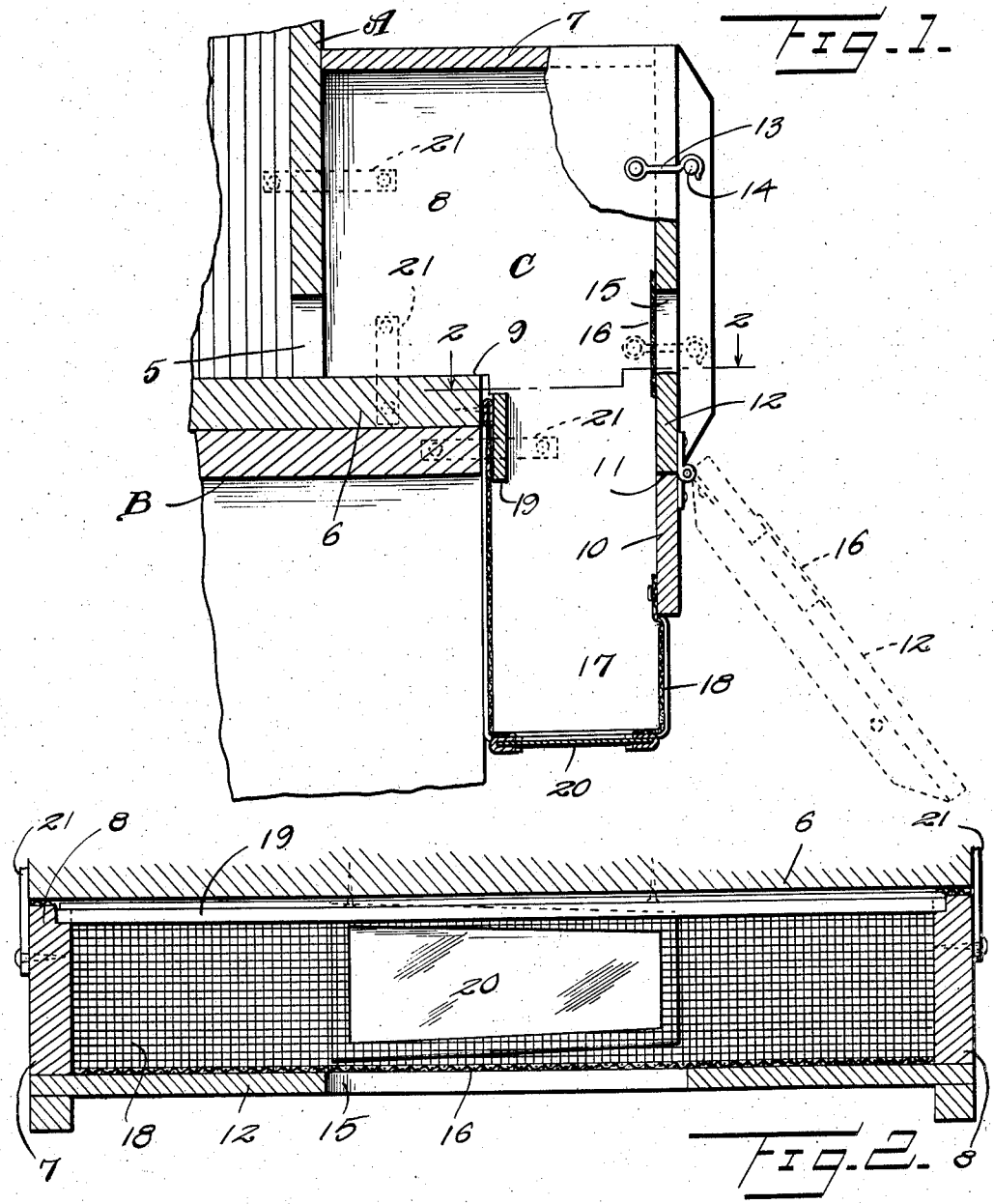
R. R. Meyer
INVENTOR
BY Victor J. Evans & Co.
ATTORNEY Patented Dec. 20, 1938

2,140,964

UNITED STATES PATENT OFFICE 2,140,964

BEEHIVE FRONTAL ENCLOSURE

Russell R. Meyer, Dakota, Ill.

Application June 22, 1937, Serial No. 149,738

1 Claim. (Cl. 6—4)

The invention relates to a beehive attachment or appliance and more especially to a beehive frontal enclosure.

The primary object of the invention is the provision of an attachment or appliance of this character, wherein the same is detachably fastened to a beehive to effect a frontal enclosure thereto so that the hive will be protected from mouse destruction when the bees and combs within the hive are stored during winter months within a cellar or other storage space and also enables a beekeeper to conveniently remove the hive from the cellar or other storage space into sunshine for a cleansing flight of the bees to relieve the same from disease.

Another object of the invention is the provision of an appliance or attachment of this character, wherein a beekeeper can use artificial heat within the cellar or storage space when a temperature lower than thirty-eight degrees exists therein to avoid the formation of frost within the beehive as well as enable the said beekeeper to ventilate the cellar or storage space for elimination of odors therein and also for the cooling of the temperature therein and in this manner maintaining the bees passive in that such bees become restless during the latter part of March and the forepart of April of each year resultant from winter storage of the hive.

A further object of the invention is the provision of an appliance or attachment of this character, wherein the same eliminates cellar robbing from one hive to the other in that the stronger colonies often rob the weaker swarms resulting in the weaker swarms running short of honey stores and thus starving.

A still further object of the invention is the provision of an appliance or attachment of this character, wherein dead bees can be readily removed in that the same will be trapped next to the entrance or exit of the hive.

A still further object of the invention is the provision of an appliance or attachment of this character, which is simple in its construction, thoroughly reliable and efficient in operation, readily and easily applied to and removed from a beehive, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary vertical sectional view through a beehive showing the appliance or attachment constructed in accordance with the invention applied and by full lines showing the door closed and by dotted lines open.

Figure 2 is a sectional view on the line 2—2 of Figure 1 looking in the direction of the arrows.

Similar reference characters indicate corresponding parts throughout the several views in the drawing.

Referring to the drawing in detail, A designates generally a portion of a box constituting the beehive and 5 an inlet and exit opening provided in the front wall thereof, the said opening being next to a forwardly projected bottom ledge 6 serving for directing the bees into the hive as well as a flight ledge when making exit from the said hive. The beehive A in the winter storage of the same is adapted to be supported upon a shelf or the like as at B within a cellar of a building or other storage space and such hive has its bottom superimposed upon the shelf B in the position as shown in Figure 1 of the drawing and this is the usual method adopted by beekeepers.

Detachably accommodated at the front of the beehive A is the appliance or attachment constituting the present invention and forming a frontal enclosure C for the said hive. The attachment or appliance comprises a front, top and end walled body 7, the rear or back of the latter being open for communication with the opening 5 in the hive A when the end walls 8 of this body are superimposed upon the ledge 6 with the bottom edge portions 9 of said end walls contacting with the said ledge while in the front wall 10 of the body 7 is a door opening 11 accommodating a vertically swinging door 12 fastened closed by hasp ledges 13 engaging keepers 14, the latter being upon the door while the hasp ledges 13 are pivoted to the end walls 8 of the body 7. This door 12 is equipped with a wire screened slot 15, the wire screen being indicated at 16 and such slot assures ventilation to the body 7 and also enables visibility for inspection interiorly of the body 7. Attached to the lowermost edge of the front wall 10 and to the depending forward extensions 17 of the end walls 8 is a reticulated wire trap 18 which is also secured to a cross rail 19 and opens upwardly into the body 7, being dependent with respect to said body 7 to be disposed immediately fore and next to the ledge 6 of the hive A so as to catch dead bees as may drop therein.

The bottom of the trap 18 has a transparent panel 20 permitting vision interiorly of the trap from without the appliance or attachment. The body 7 with the door 12 and trap 18 affords a vestibule or frontal enclosure for the beehive A, being detachably secured in position at rest upon the ledge 6 of the hive A by attaching straps 21 separably fastened to the appliance or attachment and to the end walls of both the latter and the hive A, respectively, as well as to the end walls of the appliance or attachment and the end edges of the ledge 6 of the hive.

The appliance or attachment hereinbefore described is useful during winter months with the beehive A for its storage within a cellar or other storage space and eliminates mouse destruction to the bees and combs when housed within the hive as well as the robbing of one hive to another, this being carried forth by the stronger colonies of bees over the weaker swarms. Also the appliance or attachment permits a beekeeper to remove the hive from the storage space or cellar into the open atmosphere for the benefits of sunshine and also for cleansing flight by the bees during the day thus eliminating or minimizing disease of the swarm or swarms. Further, in the use of the appliance or attachment a beekeeper is enabled to artificially heat the cellar or storage space when a temperature lower than thirty-eight degrees exists therein, which low temperature creates frost inside the beehive and is detrimental thereto as well as to the life of the bees and the honey within the hives. Additionally, it enables a beekeeper to ventilate the cellar or storage space by relieving the same of odors and also for cooling purposes thereof when a temperature of fifty degrees or higher is noticeable at which time the bees within the hive or hives become restless, their activity being particularly noticeable during the latter part of March and the forepart of April of each year.

The appliance or attachment is removed from the beehive when the latter is taken from the cellar or other storage space in the spring or during the summer months for outdoor arrangement of the hive.

An important feature of the invention is that there will be no longer a necessity for beekeepers to partition off a portion of a cellar or to screen off a portion thereof so that the bees will not fly or crawl over vegetables, canned fruits and other materials as may be stored within the cellar. Bees roaming over a cellar are very annoying to housekeepers and some have fear in making an entry to the cellar unless that portion of the same is screened or partitioned off for exclusion of the bees. This manner of handling bees in the cellar is an expensive item and a difficult problem. Therefore, with the use of the beehive frontal enclosure, the cellar preparation and expense incident thereto is no longer necessary in that the bees are enclosed. Further, the invention is very beneficial in the control of American foul brood in that diseased hives of bees will not be able to cellar rob each other and thus spread the brood from one hive to the other as would otherwise take place.

What is claimed is:

An appliance for detachable fitting with a beehive having a front ledge and a frontal inlet and exit opening thereto above said ledge, comprising a body structure forming a vestibule for said frontal inlet and exit opening and having an open bottom partially closed by said ledge, and a reticulated depending trap carried by the body structure and communicative with the vestibule through the remaining open portion of the bottom, said body structure having a screened opening at its front in alignment with the inlet and exit opening.

RUSSELL R. MEYER.